(12) United States Patent
Bouvrot

(10) Patent No.: US 9,036,239 B2
(45) Date of Patent: May 19, 2015

(54) MASSIVE ELECTROOPTICAL CELL HAVING A FINE STRUCTURE AND BASED ON MATERIALS WITH GIANT ELECTROOPTICAL COEFFICIENTS, ITS METHOD OF FABRICATION

(76) Inventor: Marc Alexandre Bouvrot, Besancon (FR)

( * ) Notice: Subject to any disclaimer, the term of this patent is extended or adjusted under 35 U.S.C. 154(b) by 10 days.

(21) Appl. No.: 13/982,016

(22) PCT Filed: Jan. 23, 2012

(86) PCT No.: PCT/FR2012/000029
§ 371 (c)(1),
(2), (4) Date: Oct. 24, 2013

(87) PCT Pub. No.: WO2012/101349
PCT Pub. Date: Aug. 2, 2012

(65) Prior Publication Data
US 2014/0036335 A1   Feb. 6, 2014

(30) Foreign Application Priority Data
Jan. 26, 2011   (FR) ..................... 11 00231

(51) Int. Cl.
| | |
|---|---|
| G02F 1/03 | (2006.01) |
| G02F 1/01 | (2006.01) |
| G02F 1/035 | (2006.01) |
| G02F 1/05 | (2006.01) |
| G02F 1/00 | (2006.01) |

(52) U.S. Cl.
CPC ............... *G02F 1/0027* (2013.01); *G02F 1/01* (2013.01); *G02F 1/03* (2013.01); *G02F 1/035* (2013.01); *G02F 1/05* (2013.01); *G02F 1/011* (2013.01); *G02F 1/0316* (2013.01); *G02F 1/0305* (2013.01); *G02F 1/0353* (2013.01); *G02F 1/0508* (2013.01)

(58) Field of Classification Search
CPC ....... G02F 1/00; G02F 1/0009; G02F 1/0018; G02F 1/0027; G02F 1/01; G02F 1/011; G02F 1/03; G02F 1/0316; G02F 1/05
USPC ......... 359/237, 245, 246, 279, 315, 316, 320, 359/322, 328, 332; 385/2, 3, 9, 122; 427/126.6
See application file for complete search history.

(56) References Cited

U.S. PATENT DOCUMENTS 4,993,811 A * 2/1991 Blazey et al. ................. 359/251
5,380,410 A * 1/1995 Sawaki et al. ................. 361/225
(Continued)

OTHER PUBLICATIONS

M. Bouvrot et al. "GHz micro-modulators for telecommunications based on $SrBaNb_2O_6$ and $KTaNbO_3$ bulk crystals", CLEO/Europe, EQEC 2009, European Conference on Lasers and Electro-Optics and the European Quantum Electronics Conference, Jun. 1, 2009, pp. 1-1.
(Continued)

*Primary Examiner* — Loha Ben
(74) *Attorney, Agent, or Firm* — Young & Thompson

(57) ABSTRACT

Electrooptical cell, including, on a substrate (1), a layer of ferroelectric massive material (4), with an electrode (2) forming an earth plane, provided between the substrate (1) and the ferroelectric layer (4), another electrode (5), narrow, mounted opposite the first above the ferroelectric layer and grooves (6) made in the ferroelectric layer, on either side of the upper electrode (5).

14 Claims, 3 Drawing Sheets

(56) References Cited

U.S. PATENT DOCUMENTS

| | | | | |
|---|---|---|---|---|
| 5,756,263 | A * | 5/1998 | Gupta et al. | 430/317 |
| 6,069,729 | A * | 5/2000 | Gill et al. | 359/245 |
| 6,310,712 | B1 * | 10/2001 | Romanovsky | 359/245 |
| 6,470,125 | B1 * | 10/2002 | Nashimoto et al. | 385/122 |
| 7,372,621 | B2 * | 5/2008 | Yoshino et al. | 359/326 |
| 7,373,065 | B2 * | 5/2008 | Yamaguchi et al. | 385/129 |
| 7,389,030 | B2 * | 6/2008 | Mitomi et al. | 385/129 |
| 7,440,161 | B2 * | 10/2008 | Morikawa et al. | 359/326 |
| 7,710,638 | B2 * | 5/2010 | Yoshino | 359/332 |
| 8,508,318 | B2 * | 8/2013 | Iwanami | 333/205 |
| 2003/0151790 | A1 | 8/2003 | Romanovsky | |

OTHER PUBLICATIONS

M. Bouvrot "Micro Modulateurs De Lumiere a Base De Cristaux Electro-Optiques a Coefficients Geants", Feb. 8, 2010, XP 055004198.

Dogheche, E. et al., "Optimum parameters in the design of electrooptic waveguide modulators using ferroelectric thin films", Ferroelectrics, 1996, ISAF '96, Proceedings of the Tenth IEEE International Symposium on Applications of East Brunswick, NJ, USA Aug. 18-21, 1996, New York, NY, USA, IEEE, US, vol. 1, Aug. 18, 1996, pp. 61-64.

International Search Report in corresponding International application PCT/FR2012/000029, dated May 14, 2012.

* cited by examiner

MASSIVE ELECTROOPTICAL CELL HAVING A FINE STRUCTURE AND BASED ON MATERIALS WITH GIANT ELECTROOPTICAL COEFFICIENTS, ITS METHOD OF FABRICATION

FIELD OF THE INVENTION

The invention relates to the field of electro-optics, especially for light modulating applications.

TECHNOLOGICAL BACKGROUND

Electro-optical cells having a so-called "micro-bulk" structure are known. As illustrated in FIG. 1, such a cell comprises a substrate (1) of glass, silicon or any other type of substrate, the properties of rigidity and thermal expansion of which are adapted to the operation of the cell, which supports a layer of thinned bulk ferroelectric material (4). An electrode (2) is provided between the substrate and the ferroelectric layer, and another electrode (5), which is narrower and mounted opposite the first electrode, is provided above the ferroelectric layer. Depending on the applications, the thicknesses of each of the elements can vary.

Such a cell is described especially in the Doctoral thesis entitled "MICRO MODULATEURS DE LUMIÈRE À BASE DE CRISTAUX ÉLECTRO-OPTIQUES À COEFFICIENTS GÉANTS" by Marc BOUVROT, held on 8 Feb. 2010 at the University of Franche-Comté, Besançon, France.

Commercial electro-optical modulators use lithium niobate. It has a Curie temperature of approximately 1134° C., which permits the creation of waveguides by surface diffusion, requiring a rise in temperature of the order of 1000° C. By contrast, its electro-optical performances remain modest.

There exist electro-optical materials which are said to have giant coefficients. These are, for example, the materials called SBN or KTN, which will be defined in detail below. By contrast, their Curie temperature is low and close to ambient temperature. The manufacture of the cell can nevertheless be carried out by fixing the crystal (monocrystal of ferroelectric type) of electro-optical material to the substrate by a technique of cold molecular welding. However, the applicant has now found that the expected advantages of electro-optical materials with giant coefficients are not being utilised fully. The present invention will improve the situation.

An electro-optical cell comprising, on a substrate, a layer of bulk ferroelectric material, with an electrode forming an earth plane provided between the substrate and the ferroelectric layer, and another, filiform electrode mounted opposite the first electrode above the ferroelectric layer, comprises grooves formed in the ferroelectric layer, on either side of the upper electrode.

BRIEF DESCRIPTION OF THE DRAWINGS

Other advantages and features of the invention will become apparent upon reading the detailed description below and from the accompanying drawings, in which.

Figure 1:
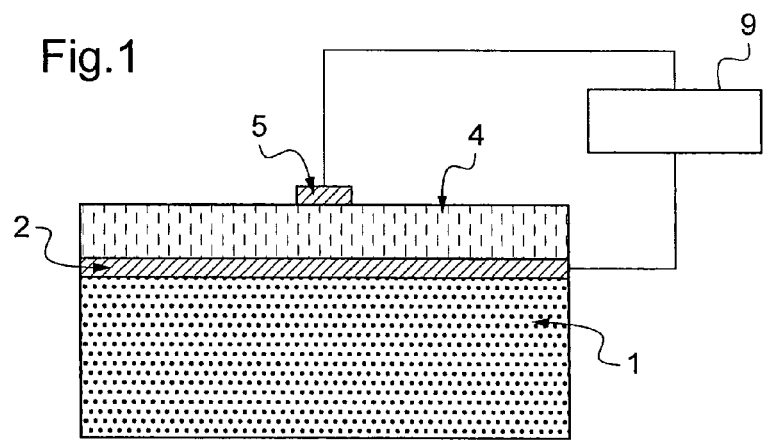
FIG. 1, already mentioned, is a schematic sectional view of a known electro-optical cell.

The drawings and the description below, with its annexes, substantially contain elements of a certain nature. The drawings show, in part at least, aspects that are difficult to describe other than by means of the drawing. They form an integral part of the description and may therefore not only serve for better understanding of the present invention but also contribute to the definition thereof, where appropriate.

The same is true of the tables annexed to the present description.

Figure 3:
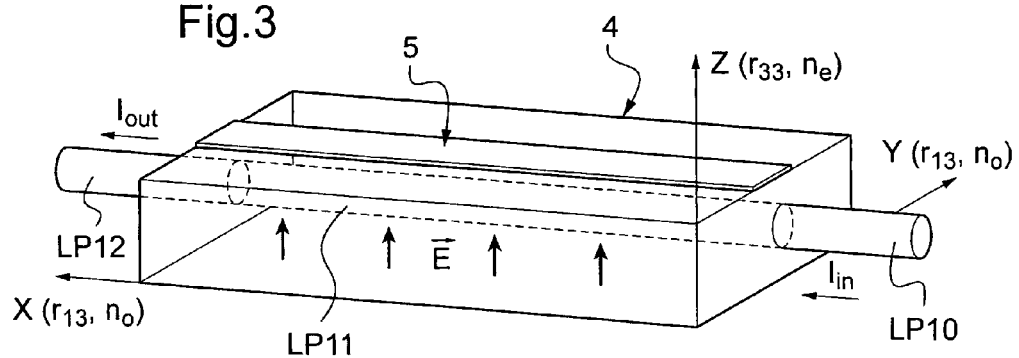
FIG. 3 is the same type of view as FIG. 2 but without showing the support, and further showing the desired orientations of the crystal, as well as the orientations of the optical and electric fields passing through the cell.

The term "length" will be used here for the direction substantially parallel to the direction of propagation of the light (vector X in FIG. 3). The term "width" will be used here for the direction substantially perpendicular to the direction of propagation of the light and in the plane of the cell (vector Y in FIG. 3). And the term "narrow" means of small width. The terms "above", "below", "upper" and "lower" will be used here with reference to the direction of the thickness of the cell (vector Z in FIG. 3).

As shown in FIG. 1, an electro-optical cell having a micro-bulk structure comprises a substrate 1 of glass or silicon which supports a layer of thinned bulk ferroelectric material 4. An electrode 2 is provided between the substrate and the ferroelectric layer, and another electrode 5, which has a narrower width than the first electrode and is mounted opposite it, is provided above the layer of bulk material. The layer of bulk material is here thinned.

Figure 2:
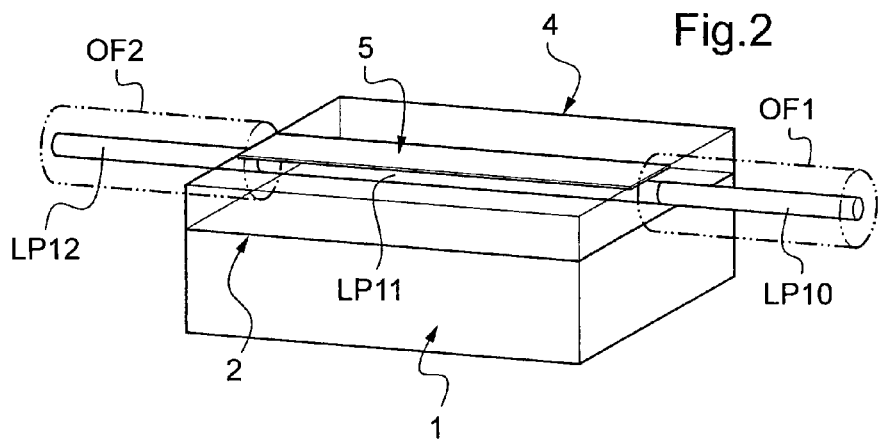
FIG. 2 is a perspective view of the electro-optical cell of FIG. 1, coupled to two optical fibres, in an experimental arrangement.

These elements will also be found in FIG. 2, which further shows an input optical fibre, OF1, and an output optical fibre OF2, the cores of which are coupled optically to the ferroelectric layer 4 which is enclosed between the electrodes 2 and 5. This defines an optical path LP10 in the input fibre OF1, then LP11 in the ferroelectric layer 4, and LP12 in the output fibre OF2.

The applications are signal processing, fibre-optic telecommunications over short and long distances, optical sensors, but also lasers, polarisation switches or applications of selection and isolation of an optical pulse from a pulse train (pulse-picking) of short pulses, especially.

The operation of the cell is based on the principle of two-wave birefringent interferometry through a capacitive microstructure formed by the two opposing electrodes. The incident optical electromagnetic wave polarised rectilinearly at the entry to the cell separates into two independent waves, each of which propagates on the neutral axes of the crystal (axes Y and Z in FIG. 3). The properties of different indices that are present on each of these axes ($n_o$ and $n_e$) induce different propagation speeds of the two waves. The latter combine at the exit of the cell to form a single optical electromagnetic wave, the polarisation state of which is different from that at the entry to the cell. The electric drive (E) of the cell allows the difference in index ($\Delta n = n_o - n_e$) between the two neutral axes of the material to be controlled, and consequently allows the polarisation state of the light passing through the localised active zone beneath the upper electrode 5 to be modified.

The ferroelectric layer 4 is here a crystal chosen especially according to the characteristics desired for the cell.

It is known that ferroelectric materials form a sub-group of the pyroelectric materials which exhibit, in certain temperature ranges, a spontaneous electric polarisation which can be eliminated or reoriented by application of an electric field. They are therefore both piezoelectric and pyroelectric. These ferroelectric materials have an overall polarisation, and therefore a relative electrical permittivity, which depends on the temperature, on the mechanical stresses and on the electric field. The coexistence of all these combined phenomena means that the study of the physical properties of these materials is difficult and is making little progress, despite the considerable interest aroused by their potential applications for many years. The above-mentioned thesis is one of the elements of these studies.

Considering the crystallographic structure of a given ferroelectric material, chapter 2 of the thesis shows how to define an electro-optical tensor which mathematically represents the properties of the ferroelectric material, as a function of the anisotropy of its optical index. The thesis also shows that there is a preferential orientation for the applied electric field permitting excitation of the highest electro-optical coefficient and the obtainment of the greatest electro-optical effect, associated with an electro-optical coefficient conventionally denoted $r_{33}$, the value of which is greater than that of the other coefficients. The values of these tensors are known and specific to each material. By way of example, the values of the linear electro-optical tensors (Pockels effect) specific to lithium niobate and to SBN are given in annex III. In linear mode, lithium niobate has a trigonal structure with 3 m symmetry, while SBN has a tetragonal 4 mm structure.

With regard to ferroelectric materials with giant coefficients, the value of the dominant coefficient varies as a function of the composition of the material. For SBN, typically between 400 and 1400 pm/V.

Hitherto, lithium niobate has principally been used, because its Curie temperature of approximately 1134° C. is sufficiently high for the creation of waveguides by surface diffusion, requiring a rise in temperature of the order of 1000° C. By contrast, its $r_{33}$ coefficient remains modest.

Materials exist whose $r_{33}$ coefficient is significantly more favourable than that of lithium niobate. They are called electro-optical materials with giant coefficients. They are, for example, the materials called SBN (strontium barium niobium), KTN (potassium tantalum niobium). By contrast, their Curie temperature is low, and close to ambient temperature, which presents a problem. As set out in chapter 3 of the thesis, one of these problems can be solved by fixing the bulk crystal of electro-optical material to a suitable substrate by a technique of cold molecular welding. This fixing is to be carried out according to the desired orientation in order to make the dominant coefficient effective. The dominant coefficient, $r_{33}$, must be oriented according to the thickness of the cell (vector Z in FIG. 3).

FIG. 3 is a perspective view similar to FIG. 2, the substrate not being shown. It illustrates a positioning of the crystal such that the $r_{33}$ coefficient acts in the vertical direction Z, causing the polarisation index $n_e$ (which is called the extraordinary index) to vary. In the other two directions X and Y, it is the $r_{13}$ coefficient, acting on the index $n_o$ (which is called the ordinary index).

When the material has only two different indices, no and ne, it is classified in the family of the uniaxial propagation media. When these three indices are all different, the medium is called biaxial. In all cases, the index of the optical propagation axis (vector X in FIG. 3) has no effect on the overall electro-optical behaviour of the cell.

A more detailed examination of the prior art will now be made.

The prior art comprises two broad types of modulators by electro-optical effect that operate on the basis of lithium niobate:
    Pockels cells used in lasers in general, or for modulation requirements in free space, and
    integrated modulators used for the requirements of very high throughput fibre-optic telecommunications.

The electro-optical effect allows the refractive index of an electro-active material to be modified, under the effect of an electric field E, and consequently allows the polarisation state of the light passing through the cell to be controlled.

Pockels cells use a capacitive bulk structure between two electrodes for applications in free optical injection (without a waveguide). However, this type of component requires large distances between the electrodes due to the bulk material used. This induces very high control voltages reaching several thousand volts, and consequently low modulation pass bands or even operation at a single modulation frequency. This likewise induces the use of a particular excitation circuit or driver adapted specifically to each cell, the cost of which is generally of the same order of magnitude as that of the cell itself.

Integrated modulators based on lithium niobate are based on a complex structure, for example that described in FR0014804. Their operation makes use of the principle of the Mach-Zehnder interferometer. The modulation is based on the mismatch of one of the arms of the Mach-Zehnder relative to the other, modifying the light interactions when the two beams are recombined at the exit of the interferometer. This technology is based on a diffused-surface guiding structure, permitting guiding of the light in the arms of the Mach-Zehnder. By contrast, the necessity of separating the optical beam in the arms, as well as the moderated value of the electro-optical coefficient $r_{33}$ involved, require great chip lengths, on the one hand in order to limit the losses by bending of the guide and on the other hand in order to obtain a sufficient electro-optical effect over the whole of the interaction length. The interaction lengths in question require a particular design of progressive wave electrodes, so as to adapt the propagation speeds of the optical and electric electromagnetic fields. This adaptation allows the optical wave to be in the presence of the same index modulation throughout its propagation in the arms.

However, this technology remains incompatible with materials with giant coefficients owing to the intrinsic properties of the materials. The main limitation is the Curie temperature of the materials. This temperature corresponds to a limit between two states of the material. Below this temperature, the material possesses spontaneous polarisation: this is the ferroelectric phase. Above this temperature, the material changes state while losing that polarisation: this is the paraelectric phase. It is therefore important always to remain below this temperature, especially during the technological manufacturing steps, in order to conserve the desired initial properties. Lithium niobate has a Curie temperature of approximately 1134° C., which permits the creation of a surface-diffused waveguide requiring a rise in temperature of up to approximately 1000° C. Materials with giant coefficients have Curie temperatures that vary as a function of their composition, but typically they do not exceed about one hundred degrees Celsius, which makes the creation of diffused guides impossible.

Lithium Niobate ($LiNbO_3$)

Lithium niobate is currently one of the most widely used materials in integrated optics owing to the combination of its many properties and characteristics. These characteristics allow the response of the material to be adapted. Lithium niobate permits the production of various photon components. In addition, the growth of crystals having excellent optical qualities is possible. The most widely used method for growing this crystal, which does not exist in the natural state, is the Czochralski method, which permits the production, at a relatively low cost, of very homogeneous crystals of several kilograms. Such monocrystals have valuable electro-optical, piezoelectric, photoelastic and non-linear optical properties.

This material is a chemical compound of niobium, lithium and oxygen ($LiNbO_3$) of trigonal crystalline structure, which is transparent for wavelengths between 350 and 5000 nanometers and exhibits a Pockels electro-optical effect. Its birefringence is strongly dependent on the temperature: a precise adjustment thereof allows any phase matching to be controlled. In its crystalline form, it is in the form of a solid material which is chemically very stable at ambient temperature, thus making it a material that is particularly attractive for applications in spatial or integrated optics. Its high Curie temperature allows it to retain its ferroelectric properties during the technological forming processes. Its tensors and electro-optical coefficients, which are given in Annex III, in point III.1, remain low but are nevertheless sufficient by virtue of the technology of diffused waveguides, which allows great interaction lengths and small distances between electrodes (and therefore a strong local electric field) to be obtained.

Commercial electro-optical systems such as the rapid modulators used in optical telecommunications have been in existence for several decades. Recent developments allow modulation frequencies to be achieved that permit throughputs greater than 40 Gb/s. In addition, many components based on $LiNbO_3$ are nowadays found in integrated optics, such as switches, couplers, Mach-Zehnder interferometers, which make use of the electro-optical properties of this material.

The applicant compared lithium niobate with other ferroelectric materials, including KTN and SBN crystals. The main findings of this comparison are shown in the accompanying Table I.

Tantalum and Potassium Niobate (KTN)

This compound, which is widely used for its non-linear properties, results from the joining together of solid compounds of $KNbO_3$ and $KTaO_3$, the proportions of which can be chosen. The large difference in the Curie temperature $T_C$ between these two compounds ($T_C$=428° C. for $KNbO_3$, compared with $T_C$=−260° C. for $KTaO_3$) means that, by adjusting the proportions of tantalum and niobium, a Curie temperature for the whole $KTaNbO_3$ that is situated between −38 and 428° C. can be obtained. The ferroelectric material therefore has a Curie temperature below 1000° C. In the paraelectric phase, the material KTN has a cubic crystalline structure: the material is isotropic. The application of an electric field to the material will have the effect of modifying the cubic structure into a tetragonal structure and will thus reveal the birefringent nature of the crystal, via the electro-optical effect. In the form of bulk crystal, KTN is a transparent crystal over the window 400-4000 nm, having the particular feature of exciting a quadratic electro-optical Kerr effect.

Figure 6A:
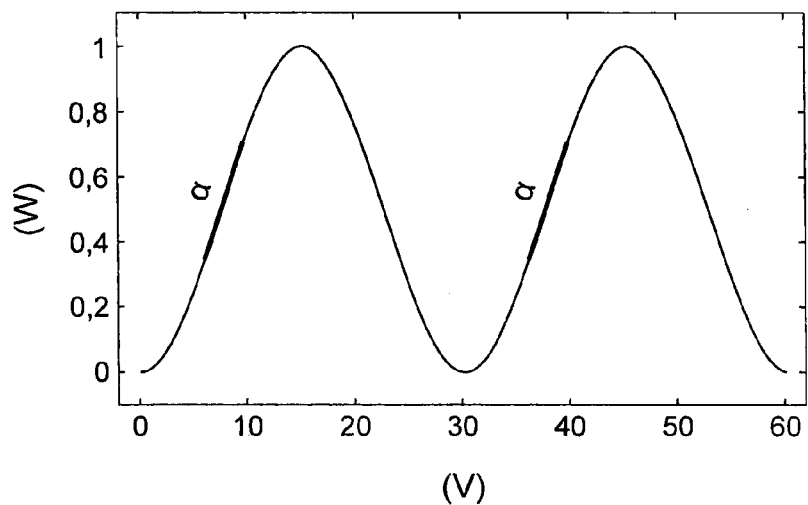
FIGS. 6a and 6b are graphic representations of the normalised detected intensity as a function of the applied voltage in linear mode and in quadratic mode, respectively, of KTN.
Figure 6B:
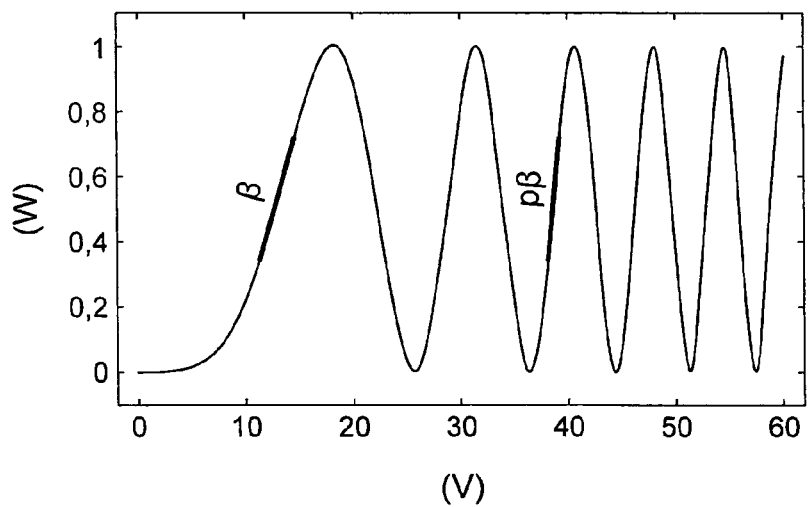

Accordingly, KTN is generally known for use in quadratic mode as opposed to linear mode. Linear mode can be observed at temperatures below the Curie temperature, close to 0° C. The optical intensity detected as a function of the applied voltage is shown in FIG. 6a. The behaviour in linear mode exhibits a motif, of sinusoidal type, which is repeated per constant step of applied voltage. The efficiency slopes are identical for the different ranges of voltage applied. However, the applicant has observed that it is possible to work in local linear mode while being in quadratic mode, that is to say above the Curie temperature. In quadratic mode, the optical intensity detected as a function of the applied voltage is visible in FIG. 6b. The behaviour in quadratic mode exhibits motifs, the period of which diminishes when the applied voltage increases. The efficiency slopes therefore increase significantly during the increase in the applied voltage, see the right-hand part of FIG. 6b. In quadratic mode, the slope pβ for an applied voltage close to 40 volts is greater than the slope β for an applied voltage close to 10 volts, which is itself greater than a slope a for an applied voltage close to 10 volts in linear mode. The KTN-based cell can therefore be excited so that the ferroelectric material is used in linear mode. The value of this material relates to the low voltages necessary to increase the efficiency slope, which nevertheless remains linear.

Accordingly, it is possible to use KTN in linear mode, the coefficient of which is of the order of several hundred picometers per volt, which is very markedly greater than that of lithium niobate, by placing itself in its ferroelectric phase below the Curie temperature.

Strontium and Barium Niobate (SBN)

$SrBaNb_2O_6$ is a ferroelectric crystal which is widely used nowadays for its piezoelectric, pyroelectric, electro-optical and, generally, non-linear optical properties of second order, for needs of photorefractivity, for example in the creation of guides by the photoreactive effect which are embedded but temporary because they are degradable in visible light.

This crystal corresponds to an assembly of solid compounds of $BaNb_2O_6$ and $SrNb_2O_6$, in order ultimately to yield the complete crystal $Sr_xBa_{1-x}Nb_2O_6$. This material has a tetragonal 4 mm crystalline structure, of which the partial concentration of barium (Ba) relative to strontium (Sr) can be adjusted from 20 to 80%. The tensor of this structure, as well as the values of its electro-optical coefficients, are given in Annex III, in point III.2. By way of example, SBN:61 will have the composition $Sr_{0.61}Ba_{0.39}Nb_2O_6$ and SBN:34 will have the composition $Sr_{0.34}Ba_{0.66}Nb_2O_6$. Its Curie temperature $T_C$ is very low compared with $LiNbO_3$: it varies from ambient temperature (approximately 22° C.) for a strontium-rich composition to 80° C. for barium-rich compositions.

Strontium and barium niobate has a paraelectric operating mode when it is maintained at a temperature greater than the Curie temperature and a ferroelectric mode when its temperature is below $T_C$.

The electro-optical properties of this crystal are very sensitive to its composition. The values of the $r_{33}$ coefficients can thus vary from 400 to 1400 pm/V, that is to say approximately 12 to 40 times those of $LiNbO_3$. In the case of SBN, for example, the greater the concentration of strontium, the higher the $r_{33}$ coefficient but the lower the Curie temperature. Depending on the use, the best compromise will be chosen.

It is proposed here to make use of the "giant properties" of the ferroelectric materials with giant coefficients having a micro-bulk structure, reducing considerably the control voltages as well as the interaction lengths necessary. The ferroelectric material may comprise at least one of the materials called SBN, KTN, KNSBN and their mixtures.

As can be seen in FIGS. 1 to 3, the structure is composed of a fine sheet of the chosen bulk ferroelectric material 4 between two metal layers 2 and 5 acting as very broad-band electrical excitation electrodes of capacitive type. This excitation generates an electric field of V/d, V being the applied potential and d the thickness of the sheet. This field is therefore greater, the finer the thickness. The modulation obtained corresponds to an electro-optically induced birefringence modulation, which is reflected in a modification of the polarisation state of the light as a function of the interaction length L. There appears a difference of phase or phase shift $\Delta\phi$ between the two components of the optical wave. This phase shift is proportional to the interaction length, to the applied electric field and to the coefficient $r_{33}$ and is inversely proportional to the thickness of the sheet of bulk ferroelectric material:

$$\Delta\phi \alpha r_{33} \cdot L \cdot V/d.$$

The main parameters are defined as follows:
geometric ratio of the structure created (L/d),
tensorial property of the chosen material ($r_{33}$),
control voltage necessary $V_\pi$ (to obtain a phase shift of $\pi$).

DETAIL OF THE INVENTION

In order to improve the performance of the cell, it can also comprise grooves 6 in the ferroelectric layer 4 surrounding the upper electrode 5 on either side of the electrode.

There will now be described a method for producing this type of modulator. The method comprises substantially the following operations:

a. Producing a deposit of metal on the chosen substrate (glass/silicon/rigid material): the thickness of the substrate is variable.

b. Producing a deposit of the same metal on the ferroelectric material; depending on the application, different materials are preferred.

c. Applying the ferroelectric material to the substrate by cold molecular pressure welding of the two deposits.

d. Thinning the bulk ferroelectric material by grinding, polishing or by ultrasonic machining. The final thickness of the ferroelectric material is defined as a function of the desired performance of the electro-optical cell.

e. Producing at least one surface electrode on the ferroelectric material by photolithography.

f. Producing grooves on either side of the surface electrode. The grooves are obtained by ablation of material, by machining with a femtosecond laser, by ultrasonic machining or by cutting with a saw.

g. Cutting and polishing optical accesses at the entry and exit of the cell.

By means of this production method there are obtained electro-optical cells that operate with control voltages of the order of 5 volts for a modulation pass band of approximately 1 GHz. Without grooves, the voltage is of the order of 15 volts instead.

The grooves produced in operation f. allow the performance to be improved by a factor of at least three. The grooves first allow the electric field to be confined beneath the surface electrode by eliminating the parasitic stray field lines that degrade the pass band. They also have the effect of increasing the overlap integral of the electric and optical fields, which favours electro-optical interaction and enables the control voltage to be reduced. They further have the effect of creating a pseudo optical waveguide of the ridge waveguide type, which improves the optical coupling in the structure and allows the insertion losses of the component to be reduced.

Figure 4A:
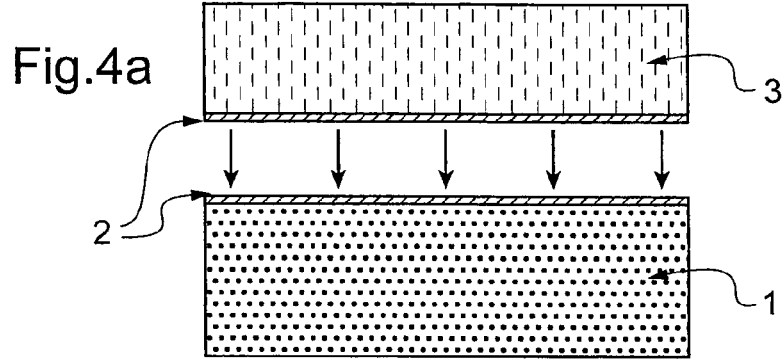
FIGS. 4a to 4d are schematic sectional views showing the manufacture of an electro-optical cell proposed herein.

FIG. 4*a* shows the substrate 1 with a metal layer 2 on the upper face and, separately, a bulk crystalline body of ferroelectric material 3, with a layer 2 of the same metal on the lower face. As indicated by the arrows, the two are pressed together to obtain cold welding in the region of the two layers 2, which fuse without exceeding the Curie temperature of the crystalline body 3. The substrate can be of glass, silicon or another rigid material. In one example, the metal layer is made of deposited gold, which is especially suitable for cold welding.

Figure 4B:
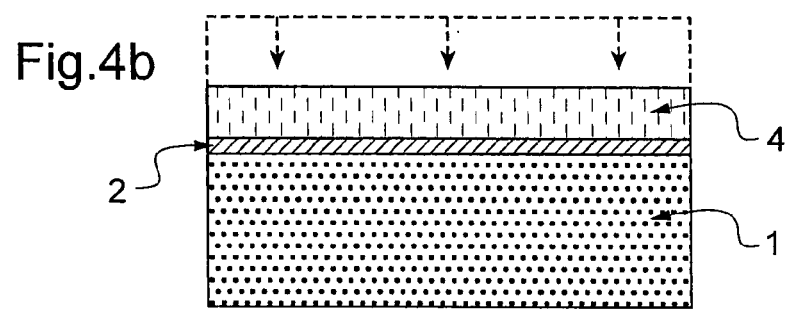

FIG. 4*b* shows the thinning of the bulk crystalline body 3, which loses thickness, as shown by the broken line, and by the arrows, to become the ferroelectric sheet 4.

Figure 4C:
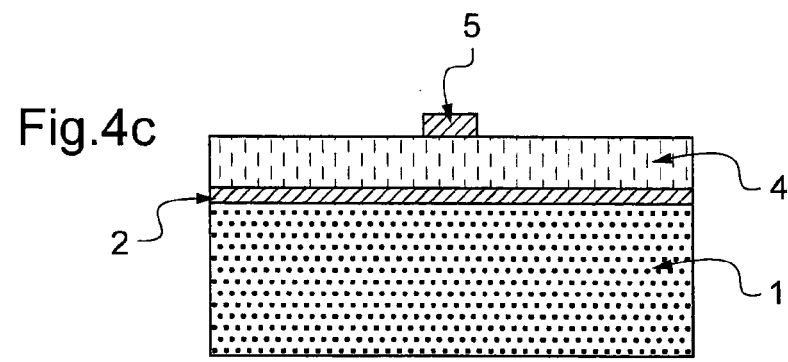

FIG. 4*c* shows the deposition of the upper electrode 5, which can also be made of gold.

Figure 4D:
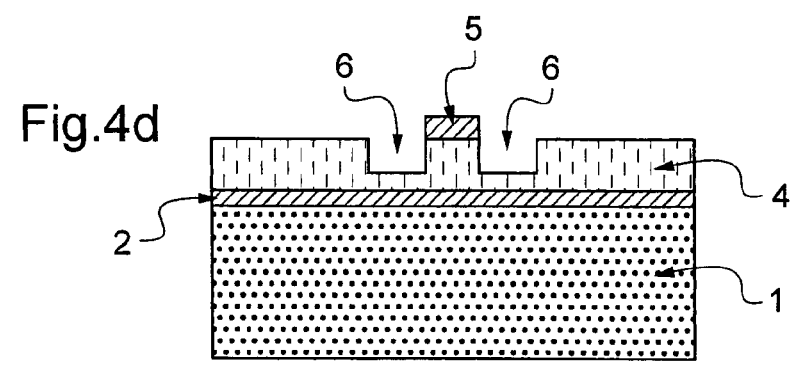

FIG. 4*d* shows the production of two grooves 6 in the ferroelectric sheet 4, in line with the upper electrode 5 and on either side thereof.

Examples of the sizing of the various parts of the cell are given in the accompanying Table II. It is possible to obtain electro-optical cells in which the distance between the electrodes is less than approximately 300 micrometers The width of at least one of the electrodes is less than the inter-electrode distance. The inter-electrode distance can fall to values of approximately ten micrometers.

Figure 5:
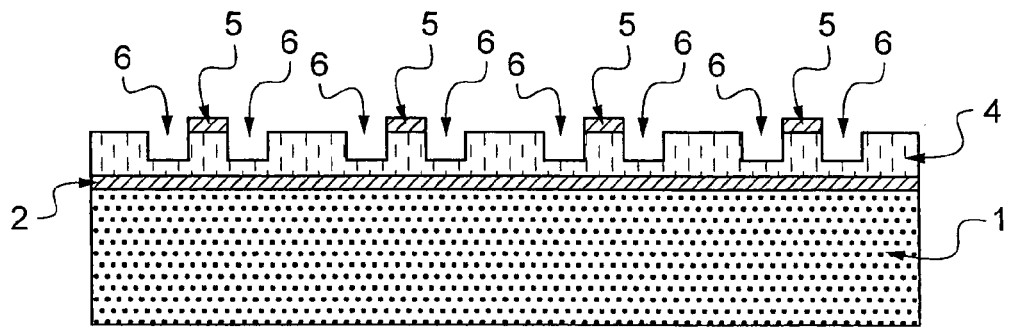
FIG. 5 is a view similar to FIG. 1 but showing a multi-track cell.

Variants of the invention allow cells to be obtained that operate in phase or intensity modulation, as desired. Starting from the proposed device, it becomes possible to produce an integrated light modulator with N independent tracks. This is shown in FIG. 5. The elements are the same as in FIG. 4*d*, except that N=5 tracks have been produced on the same substrate and starting from the same body of thinned bulk electro-optical material.

The spacing between the central axes of the electrodes 5 depends directly on the external environment in which the component is placed (optical fibres, laser system, etc.). For example, at least mutually spaced by approximately 250 micrometers, standard width of an optical fibre.

The compositions and dimensions can be the same as in Table II.

Even without pushing the band into the microwave field, it is reasonably possible to think that such a miniature product having N modulation tracks in about the hundred MHz is valuable in systems within various fields: telecommunications, signal transmission and processing in industrial and/or scientific applications. A number N of tracks of the order of 10 can be produced on a single substrate and for a single ferroelectric layer. The N independent tracks may be chosen such that N is greater than or equal to 2.

Two modes of working are possible, without limitation: phase modulation and polarisation switch.

In the first case, a dynamic phase control component of N independent tracks is obtained. Such a function is useful, for example, in a fibre laser system, actively using the power combination of N tracks. It is then possible to produce a component comprising, for example, 64 integrated modulators either on a single chip or on a plurality of juxtaposed chips.

The other function identified relates to optical switching between delay lines for the control of hyperfrequency antennae. The good optical extinction (25-30 dB) and the stability in direct current that have been measured are undeniable advantages. By virtue of the simplified microstrip structure of small length and very low capacity, hyperfrequency functioning is possible but is not absolutely necessary for this type of application. The geometric constraints therefore do not represent a technical limitation and allow the electric control voltages to be reduced to the range of several volts.

This type of component can be manufactured by the method for manufacturing cells already described. This method is modified at the level of the design of the mask for the deposition of the upper electrode: the initial motifs are reproduced repetitively over all the available width of the thinned electro-active material.

There is proposed here a light modulator that makes use of the bulk properties of ferroelectric materials with giant coefficients of thinned structure, the thickness of which varies as a function of the desired performance of the component. Under the effect of an electric field, the refractive index of the material is modified. It is therefore possible, by virtue of the invention, to carry out external modulation applications in electro-optical manner with components of submillimeter dimensions. For example, the two electrodes may be separated by a distance of less than approximately 300 micrometers.

The electric field may be obtained by means of an excitation circuit 9 connected to each of the electrodes of the cell in order to make it operate as a light phase and/or polarisation modulator. The excitation circuit 9 may likewise be arranged for operation as a light intensity modulator or switch.

The proposed device has marked advantages. For example, for the same control voltage and for crystals of the same thickness, the same electro-optical efficiency is obtained with an interaction length of 10 cm in a crystal of lithium niobate, compared with an interaction length of only 5 mm in a crystal of SBN.

The advantages that are brought about are therefore:

pronounced increase in the efficiency of optical modulation, pronounced miniaturisation of the interaction length, radiofrequency modulation pass band, simplified electro-optical structure (birefringent interferometer without waveguide), and collective production technology, with integration of independent multi-modulator components on the same component.

ANNEXES TO THE DESCRIPTION

TABLE I

|  | $LiNbO_3$ | SBN | KTN |
|---|---|---|---|
| Electro-optical effect | Pockels (linear) | Pockels (linear) | Kerr (quadratic) |
| Curie temperature | 1150° C. | 20-80° C. | 0-10° C. |
| Transmission window | 350-5000 nm | 400-5000 nm | 400-4000 nm |
| Refractive indices | $n_o = 2.29$, $n_e = 2.20$ at 633 nm $n_o = 2.21$, $n_e = 2.14$ at 1550 nm | $n_o = 2.312$, $n_e = 2.273$ | $n = 2.234$ |
| Dielectric constant | $\epsilon_{11} = 85$, $\epsilon_{33} = 29$ | $\epsilon_{11} = 450$, $\epsilon_{32} = 900$ | $\epsilon_r > 1000$ |
| Coercive field | 4 kV/mm | 250 V/mm | 230 V/mm |
| Linear electro-optical coefficients | $r_{33} = 30.8$ pm/V $r_{13} = 8.6$ pm/V $r_{22} = 3.4$ pm/V $r_{51} = 28$ pm/V | $r_{33} = 400\text{-}1400$ pm/V | $r_{33} = 600$ pm/V |
| Non-linear electro-optical coefficient |  |  | $s_{12} = -1.8 \times 10^{15}$ m$^2$/V$^2$ $s_{11}\text{-}s_{12} = 4.8 \times 10^{-15}$ m$^2$/V$^2$ |

TABLE II

|  | Parts | Dimensions | | | Nature |
|---|---|---|---|---|---|
|  |  | Length | Width | Thickness |  |
| 1 | Substrate | 500 μm to 4 mm | 800 μm to 2 mm | 500 μm to 2 mm | Glass, silicon or rigid material (which may or may not be electro-optical) |
| 2 | Metal layer/earth electrode | 500 μm to 4 mm | 800 μm to 2 mm | 2000 Å | Chrome-gold |
| 3 | Initial bulk electro-active material | 500 μm to 4 mm | 800 μm to 2 mm | 500 μm to 1 mm | Ferroelectrics: SBN, KTN, KNSBN |
| 4 | Thinned bulk electro-active material | 500 μm to 4 mm | 800 μm to 2 mm | 10 μm to 200 μm | Ferroelectrics: SBN, KTN, KNSBN |
| 5 | Upper electrode | 500 μm to 4 mm | 10 μm to 200 μm | 2000 Å | Chrome-gold |
| 6 | Grooves | 500 μm to 4 mm | 100 to 300 μm | 80% of the thickness of 4 | Air or low-index material |

Annex III

III.1 $LiNbO_3$ $$\begin{pmatrix} 0 & r_{12} & r_{13} \\ 0 & -r_{12} & r_{13} \\ 0 & 0 & r_{33} \\ 0 & r_{42} & 0 \\ r_{42} & 0 & 0 \\ r_{12} & 0 & 0 \end{pmatrix};$$

-continued $r_{12} = -3.4 \times 10^{-12} pm/V$ $r_{13} = 8.6 \times 10^{-12} pm/V$ $r_{33} = 30.8 \times 10^{-12} pm/V$ $r_{42} = r_{51} = 28 \times 10^{-12} pm/V$

III.2 *SBN* : 60

$$\begin{pmatrix} 0 & 0 & r_{13} \\ 0 & 0 & r_{13} \\ 0 & 0 & r_{33} \\ 0 & r_{42} & 0 \\ r_{42} & 0 & 0 \\ 0 & 0 & 0 \end{pmatrix};$$

$r_{13} = 46.7 \times 10^{-12} pm/V$ $r_{33} = 235 \times 10^{-12} pm/V$ $r_{42} = 30 \times pm/V$

The invention claimed is:

1. Electro-optical cell comprising, on a substrate (1), a layer of bulk ferroelectric material (4), with an electrode (2) forming an earth plane provided between the substrate (1) and the ferroelectric layer (4), and another, narrow electrode (5) mounted opposite the electrode on the ferroelectric layer, characterised in that it comprises grooves (6) formed in the ferroelectric layer on either side of the narrow electrode (5).

2. Electro-optical cell according to claim 1, characterised in that the ferroelectric material (4) has a Curie temperature below 1000° C., and in that the distance between the two electrodes (2, 5) is less than 300 micrometers, approximately.

3. Electro-optical cell according to claim 2, characterised in that the ferroelectric material comprises at least one of the materials called SBN, KTN, KNSBN and their mixtures.

4. Electro-optical cell according to claim 2, characterised in that it is excited so that the ferroelectric material is used in linear mode.

5. Electro-optical cell according to claim 2, characterised in that the distance between the two electrodes (2, 5) is approximately 10 micrometers, the width of the narrow electrode (5) being less than the inter-electrode distance.

6. Electro-optical cell according to claim 2, characterised in that it comprises N substantially mutually parallel arrangements of narrow electrodes (5) each framed by grooves (6), the N arrangements forming N independent tracks, where N is greater than or equal to 2.

7. Electro-optical cell according to claim 1, characterised in that the ferroelectric material comprises at least one of the materials called SBN, KTN, KNSBN and their mixtures.

8. Electro-optical cell according to claim 1, characterised in that it is excited so that the ferroelectric material is used in linear mode.

9. Electro-optical cell according to claim 1, characterised in that the distance between the two electrodes (2, 5) is approximately 10 micrometers, the width of the narrow electrode (5) being less than the inter-electrode distance.

10. Electro-optical cell according to claim 1, characterised in that it comprises N substantially mutually parallel arrangements of narrow electrodes (5) each framed by grooves (6), the N arrangements forming N independent tracks, where N is greater than or equal to 2.

11. Electro-optical cell according to claim 1, characterised in that it is equipped with an excitation circuit (9) provided to make it operate as a light phase modulator.

12. Electro-optical cell according to claim 1, characterised in that it is equipped with an excitation circuit (9) arranged to make it operate as a light polarisation modulator.

13. Electro-optical cell according to claim 1, characterised in that it is equipped with an excitation circuit (9) arranged to make it operate as a light intensity modulator or switch.

14. Method for manufacturing an electro-optical cell, comprising the following steps:
   a) producing a deposit of metal on a chosen substrate,
   b) producing a deposit of the same metal on a ferroelectric material,
   c) applying the ferroelectric material to the substrate by cold molecular welding of the two deposits,
   d) thinning the ferroelectric material,
   e) producing at least one surface electrode on the ferroelectric material by photolithography,
   f) producing grooves on either side of the surface electrode, the grooves being obtained by ablation of material, and
   g) cutting and polishing optical accesses at an entry and an exit of the cell.

* * * * *